United States Patent
Hartman et al.

(10) Patent No.: US 6,185,962 B1
(45) Date of Patent: Feb. 13, 2001

(54) METHOD FOR FORMING PRE-IMPREGNATED FIBERS SUITABLE FOR PROCESSING INTO A COMPOSITE ARTICLE

(75) Inventors: David R. Hartman, Granville; David L. Shipp, Newark; Andrew B. Woodside, Pickerington; Joan T. Muellerleile, Bexley, all of OH (US)

(73) Assignee: Owens Corning Fiberglas Technology, Inc., Summit, IL (US)

( * ) Notice: Under 35 U.S.C. 154(b), the term of this patent shall be extended for 0 days.

(21) Appl. No.: 08/864,230

(22) Filed: May 23, 1997

Related U.S. Application Data

(63) Continuation-in-part of application No. 08/643,050, filed on May 2, 1996, now Pat. No. 5,840,370.

(51) Int. Cl.$^7$ .................................................. C03C 25/02
(52) U.S. Cl. ............................... 65/447; 65/430; 65/432; 65/443; 65/450; 65/451; 427/372.2; 427/379; 427/389; 427/389.7
(58) Field of Search .......................... 65/430, 432, 443, 65/447, 450, 451; 427/372.2, 379, 389, 389.7

(56) References Cited

U.S. PATENT DOCUMENTS

| | | |
|---|---|---|
| 2,880,552 | 4/1959 | Whitehurst . |
| 3,119,711 * | 1/1964 | Starmann et al. ................. 427/389.7 |
| 3,143,405 | 8/1964 | Wong . |
| 3,249,412 | 5/1966 | Kolek et al. . |
| 3,349,222 | 10/1967 | Johnston . |
| 3,384,505 | 5/1968 | Palmer et al. . |
| 3,576,705 | 4/1971 | Goldsworthy . |
| 3,620,701 | 11/1971 | Janetos et al. . |
| 3,653,860 | 4/1972 | Smith et al. . |
| 3,717,448 | 2/1973 | Smith . |
| 3,718,448 * | 2/1973 | Drummond et al. ...................... 65/3 |
| 3,718,449 | 2/1973 | Fahey . |
| 3,852,051 | 12/1974 | Fahey . |
| 3,853,605 * | 12/1974 | Fahey . |
| 3,867,328 | 2/1975 | Fahey . |
| 3,887,347 | 6/1975 | Reese et al. . |
| 3,918,947 * | 11/1975 | Maaghul et al. ...................... 65/451 |

(List continued on next page.)

FOREIGN PATENT DOCUMENTS

| | | |
|---|---|---|
| 441453A2 | 2/1991 | (EP) . |
| 242793 * | 3/1993 | (EP) . |
| 805127A1 | 4/1997 | (EP) . |
| 96/05148 * | 2/1996 | (WO) . |
| WO 96/05148 | 2/1996 | (WO) . |

OTHER PUBLICATIONS

Derwent Publications Ltd., London, GB; Class A32, AN 97–037421 XP002075584.
Derwent Publications Ltd., London, GB; Class A32, AN 96–460205 XP002075585.
Clayton A. May,"Epoxy Resins Chemistry and Technology" pp. 687–690.

*Primary Examiner*—Stanley S. Silverman
*Assistant Examiner*—Michael P. Colaianni
(74) *Attorney, Agent, or Firm*—Inger H. Eckert

(57) ABSTRACT

A method is disclosed for forming coated fibers suitable for making a composite article. A plurality of fibers are coated with an aqueous- or non-aqueous-based chemical treatment containing a curable resin such that the resin on the fibers is in a partially cured or uncured state. The coated fibers may then be formed into a composite article in a subsequent forming operation, for example, by filament winding, pultrusion, weaving, knitting, or extrusion coating. The strand of fibers may also be shaped into a preform which can be used in resin transfer molding (RTM) and injection molding processes.

6 Claims, 2 Drawing Sheets

U.S. PATENT DOCUMENTS

| | | |
|---|---|---|
| 3,925,286 | 12/1975 | Fahey . |
| 3,940,357 | 2/1976 | Fahey . |
| 3,996,033 | 12/1976 | Chickowski . |
| 3,997,306 | 12/1976 | Hedden . |
| 4,013,435 | 3/1977 | Kane et al. . |
| 4,042,360 | 8/1977 | Kane et al. . |
| 4,049,597 | 9/1977 | Motsigner . |
| 4,076,869 | 2/1978 | Flynn . |
| 4,197,228 | 4/1980 | Lin et al. . |
| 4,220,686 | 9/1980 | Brook . |
| 4,351,752 | 9/1982 | Das et al. . |
| 4,427,482 | 1/1984 | Yamada et al. . |
| 4,440,557 | 4/1984 | Morrison et al. . |
| 4,501,787 | 2/1985 | Marchetti et al. . |
| 4,528,308 | 7/1985 | Waddill . |
| 4,593,069 | 6/1986 | Kamagata et al. . |
| 4,608,304 * | 8/1986 | Rosthauser ............................ 65/447 |
| 4,615,946 | 10/1986 | Temple . |
| 4,745,028 | 5/1988 | Das et al. . |
| 4,853,021 | 8/1989 | Soszka et al. . |
| 5,011,523 | 4/1991 | Roncato et al. . |
| 5,055,119 | 10/1991 | Flautt et al. . |
| 5,120,384 | 6/1992 | Yoshimitsu et al. . |
| 5,123,949 | 6/1992 | Thiessen . |
| 5,178,657 | 1/1993 | Gicquel . |
| 5,310,600 | 5/1994 | Tsuya et al. . |
| 5,312,651 | 5/1994 | Takada et al. . |
| 5,316,561 | 5/1994 | Roncato et al. . |
| 5,387,468 | 2/1995 | Pollet et al. . |
| 5,605,757 | 2/1997 | Klett . |
| 5,626,916 | 5/1997 | Kishi et al. . |
| 5,700,574 | 12/1997 | Flautt et al. . |
| 5,779,758 | 7/1998 | Mann et al. . |
| 5,783,252 * | 7/1998 | Appelt et al. ..................... 427/389.7 |
| 5,840,370 | 11/1998 | Woodside et al. . |
| 5,916,679 * | 6/1999 | Woodside et al. ..................... 65/443 |

* cited by examiner

METHOD FOR FORMING PRE-IMPREGNATED FIBERS SUITABLE FOR PROCESSING INTO A COMPOSITE ARTICLE

CROSS-REFERENCE TO RELATED APPLICATION

This application is a continuation-in-part of U.S. application Ser. No. 08/643,050, filed May 2, 1996 now U.S. Pat. No. 5,840,370.

This application is related to contemporaneously filed U.S. patent application Ser. No. 08/864,229, entitled "COATED GLASS FIBERS," by David R. Hartman et al., having attorney docket number 23813A, incorporated by reference herein.

TECHNICAL FIELD AND INDUSTRIAL APPLICABILITY OF THE INVENTION

The present invention relates to a method for forming coated fibers suitable for reinforcing composite products, and more particularly to a method of forming coated fibers in which fiber strands are coated with a chemical treatment containing a curable thermoset resin which is uncured or only partially cured during the manufacture of the strand, but is fully cured during off-line processing of the coated fiber strand into a composite article or product.

BACKGROUND OF THE INVENTION

Fiber reinforced composite products or articles have been made using a variety of processes and materials. One common type of composite article includes a polymeric matrix reinforced with a plurality of ceramic reinforcing fibers (e.g., glass fibers). Glass and other ceramic reinforcing fibers are commonly manufactured by supplying the molten ceramic material to a bushing, drawing fibers from the bushing, applying a chemical treatment, such as an aqueous-based system, so as to size the drawn fibers, and then gathering the sized fibers into a tow or strand.

In fabricating a composite part, the fibers in each of a plurality of fiber strands are often further chemically treated in an off-line impregnation process with either a thermoset resin, one or two part, or a thermoplastic resin. For example, in one such process a bundle or strand of glass fibers is impregnated with a heat curable thermosetting resin and then pulled through a heated pultrusion die, simultaneously curing the resin and making a composite part such as, for example, a ladder rail. Composite products have also been fabricated in a filament winding process by feeding the fiber strands through a bath of a heat curable thermosetting resin, winding the impregnated strand around a mandrel and curing the thermoset resin to form a filament wound part such as a pipe.

Composite articles made with a thermosetting polymer matrix can exhibit superior mechanical properties compared to composite articles made with a thermoplastic polymer matrix. This is particularly true when the composite article is exposed to high temperatures.

However, once the thermosetting resin is cured, the impregnated strand cannot be molded or reshaped in subsequent processing. This characteristic of a thermoset impregnated fiber strand has caused such strands to be formed into the desired composite article soon after the strand is impregnated. Typically, when a thermoset resin is used, the composite article has had to be formed in-line with the process of impregnating the fiber strand. In contrast, the ability of thermoplastic polymers to be remelted enables thermoplastic impregnated strands to be subsequently heated and molded or otherwise shaped into various articles or products in off-line processes. Thus, thermoplastic impregnated strands are typically easier to work with and more versatile.

Accordingly, there is a need in the art for a method for forming a fiber strand which exhibits the mechanical properties of a fiber strand coated with a thermosetting resin while also being easier to work with and more versatile than previous thermoset impregnated fiber strands. In particular, there is a need for a method of forming a thermoset coated fiber strand which can be formed into a composite article in a subsequent off-line forming operation and then fully cured.

SUMMARY OF THE INVENTION

The present invention meets this need by providing a method for coating fibers by applying an aqueous or non-aqueous chemical treatment or composition to the fibers. The chemical treatment comprises a thermoset resin system which undergoes little or no curing during in-line processing, but which can be completely cured or crosslinked during a subsequent off-line composite forming operation. The thermoset resin system includes a curable resin and may or may not include a curing agent, a catalyst or an accelerant. The chemical treatment may be applied with sufficient amounts of the thermosetting resin to form all of the matrix of the final composite article. Alternatively, additional resin material, which may be the same or different than the type of resin material used in the chemical treatment, may be added with the coated fibers during the final composite product forming process to form the balance of the matrix.

In accordance with one aspect of the present invention, a method of forming coated fibers suitable for making a composite article is provided comprising the steps of providing a plurality of fibers and then applying a chemical treatment containing a curable thermosetting resin with or without other chemical treatment constituents (e.g., a curing agent, catalyst, accelerant, silane coupling agent, citric acid, etc.) to the fibers. The thermosetting resin is in a partially cured or uncured state. For purposes of the present invention, a "curing agent" is defined as a chemical compound which increases the rate of cure of a resin and adds to the molecular weight or stoichiometry of the final cured resin. An "accelerant" is defined as a chemical compound which increases the rate of cure of a resin without adding to the molecular weight or stoichiometry of the final cured resin.

In one embodiment, the chemical treatment is aqueous-based, with a concentration of about 20–70% by weight of the curable thermoset resin and, if present, other chemical treatment constituents, with the remaining balance being water. In an alternative embodiment, the chemical treatment may be non-aqueous, with a concentration of about 98–100% by weight of the curable thermoset resin and, if present, other chemical treatment constituents, with the remaining balance being water.

In one embodiment, the chemical treatment of the present invention is coated on a plurality of fibers. It is desirable for the chemical treatment to preimpregnate or impregnate the plurality of fibers. Pre-impregnating or impregnating involves applying a sufficient amount of the chemical treatment to a plurality of fibers such that the spaces between the fibers are substantially filled when the fibers are formed into a bundle or strand. Sizing on the other hand, involves applying a relatively thin protective coating of chemical treatment to the surface of each glass fiber. Glass reinforcing fibers are generally considered sized when they contain chemical treatment constituents on the order of about 0.5% by weight, as determined by a conventional loss on ignition (LOI) test. A conventional loss on ignition (LOI) method can be used to determine the amount of the organic compounds loaded onto the ceramic fibers (e.g., glass fibers). Coating includes sizing, preimpregnating, impregnating, or any other application of chemical treatment on a plurality of fibers.

When an aqueous based chemical treatment is applied, it is desirable for the chemically treated fibers to be heated to drive off a substantial amount of the water in the chemical treatment to dry the fibers. This heat can be provided, for example, by bringing the coated fibers into contact with a heating device, (e.g., a hot plate) which heats the coated fibers without effecting full curing of the resin. It is desirable for the resin not to be cured at all. Where the chemical treatment is aqueous-based, the heating step functions to drive off water, effecting drying of the fibers. Where the chemical treatment is non-aqueous, the heating step may effect partial curing, and thereby, thickening of the chemical treatment.

The resin applied to the fibers can be a heat curable type. For example, the curable thermoset resin can be a heat curable epoxy resin. An epoxy resin chemical treatment may include a curing agent such as, for example, an amine or amide. An accelerant may also be included in the resin system. Where the chemical treatment includes a curing agent and/or an accelerant, the curing time of the thermosetting resin may be tailored such that little or no curing, or only partial curing takes place when the fibers are brought into contact with the heating device.

In one embodiment of the invention, the fibers are glass fibers and the step of providing a plurality of fibers includes drawing the glass fibers from a source of molten glass. The fibers of the present invention can also include preformed glass and/or synthetic fibers.

In another embodiment of the invention, a method is provided for forming a fiber strand in which a plurality of coated fibers are formed into a fiber strand suitable for making a composite article. The fiber strand may be wound to form a fiber strand package, or alternatively, may be chopped into discrete lengths for further processing.

The heating device used in the present invention can comprise a contact plate which transfers energy in the form of heat to the chemical treatment on the fibers. For an aqueous-based system, the chemical treatment on the fibers is dried but the resin is not fully cured. The heating device drives off the water from the aqueous-based chemical treatment and, depending on the thermoset resin system used, may effect no curing or partial curing of the resin. The resin on the fibers is then fully cured in a subsequent forming operation, such as a filament winding process (e.g., the filament winding of pipe) or a pultrusion process (e.g., to form ladder rails). The coated fibers may also be used in a variety of other off-line processes. For example, the fibers may be woven or knitted into a composite fabric for use in forming composite articles having reinforcing fibers disposed in a matrix of a polymeric material.

Thus, the present invention also provides a method of making a composite article in which fibers, coated with an aqueous-based or non-aqueous chemical treatment containing a curable resin, are processed in-line without effecting complete curing of the resin and formed into a composite article in a subsequent forming operation.

Accordingly, it is a feature of the present invention to provide a method for forming coated fibers in which a chemical treatment containing a curable resin is applied to the fibers without effecting full curing of the resin. It is a further feature of the invention to provide coated fibers or fiber strands which are suitable for making a composite article in a subsequent forming operation. These and other features and objects of the present invention, along with their advantages, will become apparent from the following detailed description, the accompanying drawings, and the appended claims.

DETAILED DESCRIPTION AND PREFERRED EMBODIMENTS OF THE INVENTION

Figure 1:
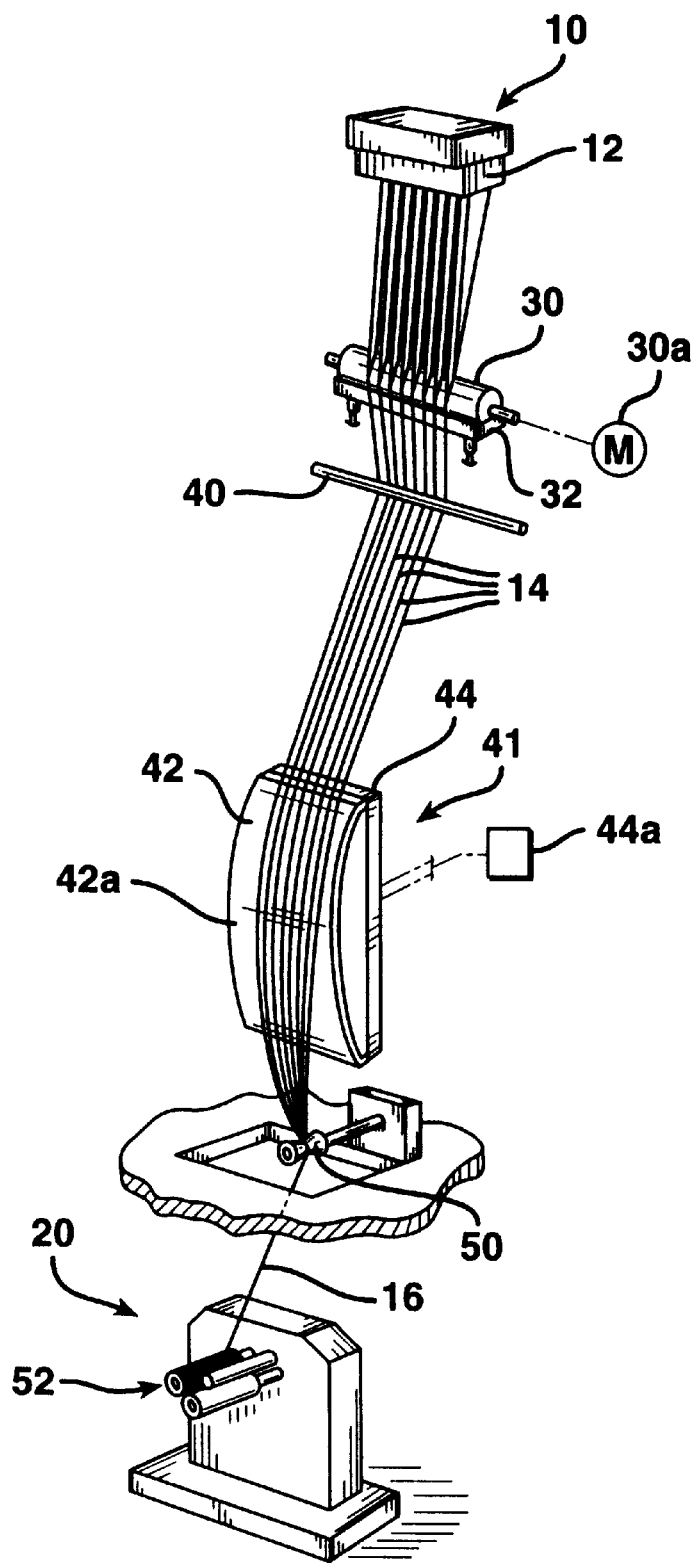
FIG. 1 is a perspective view of an apparatus for coating a strand of fibers in accordance with the present invention.

The coated fibers or fiber strands of the present invention provide several advantages over other coated fibers used to make composite products. The present fiber strands can be coated with enough matrix resin so that further resin application is unnecessary. Also, the present resin coated fiber strands can be transported, shaped, and then fully cured just by heating. No additional chemicals need to be applied. In addition, depending on the concentrations of the chemical treatment constituents (i.e., thermoset resin, curing agent, catalyst and accelerant), the fiber strand of the present invention can be transported and stored for prolonged periods of time. For example, a fiber strand coated with an EPON® epoxy resin (available from Shell Chemical Company) containing 4 phr (parts per hundred resin) of the curing agent dicyandiamide can be stored for almost one year before fully curing.

The method of producing coated fiber strands of the present invention allows an aqueous- or non-aqueous-based chemical treatment to be applied to the fibers during an in-line process and, if applicable, heated without effecting full curing of the thermosetting resin in the chemical treatment. The present method provides several advantages over prior art methods including those methods which apply a size to the fibers during the glass forming process and then draw the fibers through an off-line resin bath prior to final processing into a composite product. With the present invention, all of the matrix of the final composite article may come from the applied chemical treatment. Hence, off-line processes such as filament winding or pultrusion processes may be practiced without requiring the addition of further resin material and, as a result, such processes can be run at much faster speeds. Furthermore, open resin baths are not needed, which baths can emit into the working environment undesirable volatile organic compounds or VOC's. Alternatively, additional resin material, which may be the same as or different than the type of resin material used in the chemical treatment, may be added to the strand of coated fibers before or during the final composite product forming process to form the balance of the matrix. In the case of preimpregnated fibers, any additional resin can be added very quickly since the fibers of a formed strand are already impregnated. That is, the fibers are sufficiently wet that the resin has penetrated the fibers such that only the outer, exposed surface of the strand would need to be coated, if at all.

While the fibers referred to in the drawings are continuously formed glass fibers, other types of fibers are also suitable for use in the present invention including preformed fibers (fibers which were previously formed off-line), like synthetic fibers (non-glass fibers) such as Kevlar®, carbon or graphite fibers, silicon carbide (SiC) fibers and other non-glass fibers. It may even be desirable for polymeric fibers (preformed or continuously formed) to be used in the making the present strand. For example, these polymeric fibers could be reinforcing fibers, if they were capable of surviving the composite product forming operation. It is desirable for the present strand to include glass fibers continuously drawn from a source of molten glass.

The heating device that can be used in the present invention can comprise a contact plate which transfers energy in the form of heat to the chemical treatment on the fibers. For an aqueous-based system, the chemical treatment on the fibers is dried but the resin is not fully cured. The heating device drives off the water from the aqueous-based chemical treatment and, depending on the thermoset resin and the other chemical treatment constituents used, if any, may effect no curing or partial curing of the resin. The thermoset resin on the fibers is then fully cured in a subsequent forming operation, such as a filament winding process (e.g., the filament winding of pipe), a molding process or a pultrusion process (e.g., to form ladder rails). The present fiber strands may also be used in a variety of other off-line processes. For example, the present fiber strands may be woven or knitted into a composite fabric for use in forming composite articles having reinforcing fibers disposed in a matrix of a polymeric material.

A desirable aqueous or non-aqueous chemical treatment or composition for use in the present invention comprises a heat curable epoxy resin and an amine or amide curing agent. Exemplary heat curable epoxy resins include Shell EPI-REZ 3522-W-60 (aqueous) and 6006-W-70 (aqueous), EPON 862 epoxy bisphenol F liquid (aqueous or non-aqueous), which are commercially available from Shell Chemical Company. An exemplary curing agent is dicyandiamide, available from American Cyanamide. This curing agent is desirable because it requires exposure to a high temperature environment for a sufficient amount of time, such as 15 minutes, before a substantial amount of curing occurs, thus allowing only partial, if any, curing of the epoxy resin during passage of the fibers over the heating device 41 or prior to the subsequent off-line curing operation. Another suitable curing agent is a polyamide available from Shell Chemical Company under the designation EPI-CURE 8535-Y-50.

In addition to a curing agent, the present chemical X; treatment may include an accelerant such as, for example, EMI-24 imidazole (2-ethyl-4-methyl imidazole), commercially available from Air Products. It is desirable for the accelerant to be 2-methyl imidazole available from Aldrich Chemical Co. Once the thermoset resin begins to cure, the accelerant increases the rate of curing. By adjusting the amount and type of accelerant used, if any, the flow (i.e., viscosity) and the tack (i.e., the extent of curing) of the applied chemical treatment can be optimized. For example, in a continuous fiber strand forming operation where the strand is coated with a heat curable thermoset resin and heat is applied to effect some degree of curing, an accelerant would enable a certain degree of desired curing to be obtained, even at the high throughput rates typical of continuous strand forming operations. In addition, it may be desirable for an accelerant to be included when faster cure rates are desired during the composite product forming step, in order to increase the throughput of that operation.

By varying the amount of the accelerant and the type of curing agent used, the curing profile (i.e., the rate and degree of curing) of the chemical treatment may be adjusted for different processes and applications. The curing profile may also be adjusted by varying the ratio of the accelerant and the curing agent. To optimize the shelf life of the resulting fiber strand 16, for example, the amount of the accelerant may be decreased while keeping the amount of the curing agent the same. This allows for the control of the rate of the crosslinking reaction.

It is desirable for the thermosetting resin and curing agent to be applied in a stoichiometric ratio. It may also be desirable for this ratio to vary depending on the desired end use for the fiber strand. For example, in embodiments where glass fibers are used and additional matrix resin is to be added off-line, a lower level of thermoset resin may be applied such that a stoichiometric ratio is achieved when the additional matrix material is added.

The chemical treatment can be selected so as to tailor the interface between the glass fiber surface and the matrix resin, for example, to obtain better wetting of the coated glass fibers by the matrix resin. That is, the chemical treatment can be chosen so as to provide better coverage and bonding of the matrix material to the glass fibers forming the strand.

While the ratios of the chemical treatment constituents may be varied, it can be desirable for the ratio of constituents to be as follows: about 100 parts curable thermoset resin, about 2 parts curing agent, and about 0.5 parts accelerant. Varying the ratios of the ingredients and/or the type of constituents used can vary the curing temperature. For example, when an EPON® epoxy resin (available from Shell Chemical Company) is combined with 4 phr of the curing agent dicyandiamide without an accelerant, the curing temperature will range from 150° C. to 175° C., depending on the exact type of resin used. On the other hand, if 2–10 phr of the accelerant 2-ethyl-4-methyl imidazole is used with an EPON® resin and no curing agent, the curing temperature will range from 60° C. to 150° C., depending on the percentage of accelerant and the specific thermoset resin used.

It is desirable for the coated fibers to be coated with about 8% to 35% by weight of a curable thermoset resin and other chemical treatment constituents; and it is more desirable for the coated fibers to be loaded with about 30% by weight or more of a curable thermoset resin and other chemical treatment constituents. A conventional loss on ignition (LOI) method can be used to determine the amount of resin and other organic chemical treatment constituents loaded onto the fibers.

Other heat curable thermoset resins may also be used in the present invention, including polyurethanes and polyimides, which may be used in aqueous or non-aqueous form. It should be appreciated that when these or other heat curable thermoset resins are used, a heating device may be used to effect partial curing of the applied thermoset resin.

Optionally, the present chemical treatment may also include a silane coupling agent as well as a small amount of citric acid which functions to disperse the silane. It is desirable for the silane coupling agent to be used in percentages from 0 to about 10%. Also, butoxy ethyl stearate (BES) may be included in the chemical treatment of the present invention. BES is a fatty acid ester used as a lubricant in the treatment. It is desirable to use the BES in percentages from 0 to about 5%.

The chemical treatment in the coated fiber strands of the present invention contain organic compounds. It is desirable for the total organic compounds in each strand to be present in percentages from about 0.5% to about 35%. It is desirable for thermoset resin compounds to be present in amounts from about 0.5% to about 35%. It is desirable for the curing agent to be present in amounts from 0 to about 10% and for an accelerator to be present in amounts from 0 to about 10%.

FIG. 1 illustrates an apparatus 10 for coating glass fibers in accordance with the present invention. This apparatus 10 includes a heated bushing 12 having a number of orifices (not shown) through which a plurality of streams of molten glass are discharged. The streams of glass are mechanically drawn to form continuous fibers 14 via a drawing device illustrated as a rotatable member or winder device 20. The fibers 14 pass over an applicator roller 30 which applies the aqueous- or non-aqueous-based chemical treatment containing the curable thermoset resin to the fibers 14. A trough 32 containing the chemical treatment is positioned below the roller 30. The roller 30 extends into the trough 32 and, as it is rotated by a conventional drive device 30a, transfers an amount of the chemical treatment from the trough 32 to the fibers 14. Other devices or techniques for applying a chemical treatment to the glass fibers 14 may be used in place of the applicator roller 30.

In the illustrated embodiment, the coated fibers 14 pass over and contact a heating device 41 which is substantially similar to the heating device set forth in commonly assigned, copending U.S. application Ser. No. 08/291,801, filed Aug. 17, 1994, and entitled METHOD AND APPARATUS FOR FORMING CONTINUOUS GLASS FIBERS, abandoned in favor of continuation application U.S. Ser. No. 08/651,197, now U.S. Pat. No. 5,779,758 the disclosure of which is hereby incorporated by reference. It is desirable for an engagement roller or bar 40 to be provided between the applicator roller 30 and the heating device 41 to ensure that the fibers 14 make good contact with both the applicator roller and the heating device 41.

The heating device 41 comprises a first plate 42 (also referred to herein as a contact plate) having a curved outer surface 42a which, in the illustrated embodiment, makes direct contact with the coated fibers 14. A resistance-heated second plate 44, which is connected to a power supply 44a, is spaced a small distance from the first plate 42 and serves to radiantly heat the first plate 42. As the fibers 14 pass over the first plate 42, energy in the form of heat is transferred from the first plate 42 to the coated fibers 14. When an aqueous-based chemical treatment is being used, the heat transferred from the first plate 42 to the fibers 14 evaporates water from the chemical treatment. Depending on the type of thermoset resin and/or curing system used, the heating device may effect little, if any, curing of the resin on the fibers 14 or partial curing may take place. When a non-aqueous chemical treatment is used, the heat transferred from the first plate 42 to the fibers may effect some thickening of the chemical treatment due to partial curing of the chemical treatment.

For aqueous chemical treatments, it is desirable for the temperature of the hot plate 42 to be maintained at a temperature in the range of about 1000° F. to about 1500° F. and more preferably from about 1200° F. to about 1300° F. Where the fibers 14 are coated with an aqueous chemical treatment, upon contact with the plate 42, a substantial amount of the heat energy is directed toward evaporation of the water contained in the treatment. Accordingly, the heat is less likely to fully cure the resin in the aqueous chemical treatment because the fibers 14 are not in contact with the plate 42 long enough to reach a temperature for a sufficient amount of time such that the resin will fully cure. When fibers treated with a non-aqueous chemical treatment contact the plate, the heat functions to chemically thicken the treatment and initiate partial crosslinking. The temperature of the hot plate 42 should not exceed about 550° F. to about 950° F. if the fibers are coated with a non-aqueous chemical treatment and come in contact with the plate 42.

Figure 2:
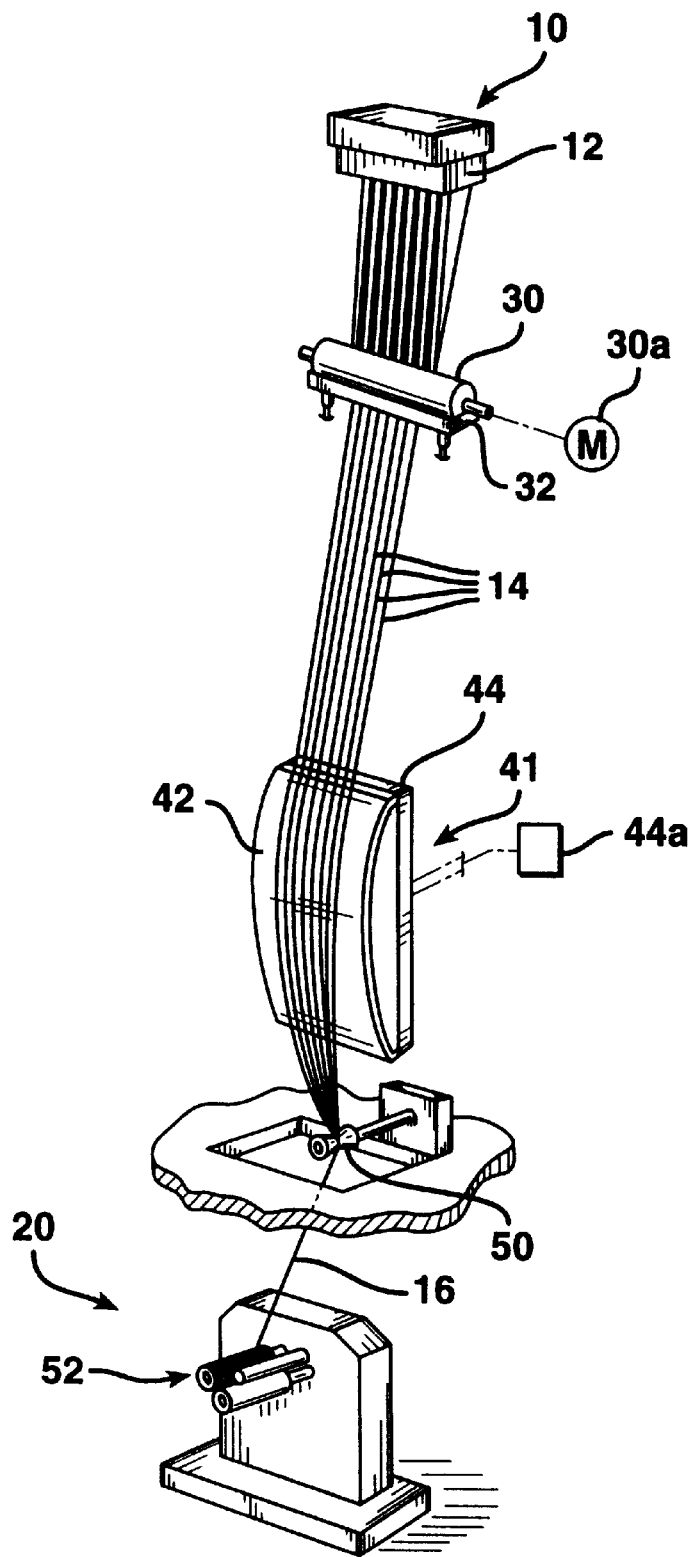
FIG. 2 is a perspective view of an alternative apparatus for coating a strand of fibers.

In an alternative embodiment of the invention illustrated in FIG. 2, the applicator roller 30 applies the chemical treatment to the reverse side of the fibers. In this embodiment, the engagement bar between the applicator roller and the heating device is eliminated, and the fibers are passed in close proximity to the contact plate 42 of the heating device without actually contacting the plate 42 such that they are radiantly heated. It is contemplated that fibers coated with an aqueous chemical treatment or a non-aqueous chemical treatment may be radiantly heated. However, it is more likely that fibers coated with a non-aqueous chemical treatment will be dried via radiant heat.

If desired, a stainless steel cover or casing (not shown) may enclose substantially the entirety of the hot plate of the heating device. The heating device and casing define a high temperature environment through which the fibers pass such that the fibers are radiantly and convectively heated as they pass in close proximity to the heating device. It should be appreciated that other variations of the heating device may be used and that any type of suitable heating device may be within the scope of the invention.

After passing the first plate 42, the fibers 14 are gathered via a gathering shoe 50 to form a single tow or strand 16. From the gathering shoe 50, the tow 16 is wound via the winder device 20 to form a glass fiber package 52. The wound coated strand 16 of fibers 14 may later be unwound from the package 52, then filament wound into a desired composite article and cured. It is desirable to cure the chemical treatment in the coated strand of fibers at a temperature of from 150° F. to 350° F., depending on the type of curing system used.

In a pultrusion process, the strand of coated fibers is unwound from the package 52, pulled through a heated die (not shown) and cured.

It is also contemplated that the strand of coated fibers may be chopped into discrete lengths instead of wound and used in a subsequent molding process.

The coated strand of fibers of the present invention may also be formed into a composite fabric, for example by knitting, using the apparatus set out in U.S. application Ser. No. 08/527,601 filed Sep. 13, 1995, and entitled METHOD AND APPARATUS FOR FORMING A COMPOSITE FABRIC, the disclosure of which is hereby incorporated by reference. In such a process, it is desirable for the chemical treatment applied to the fiber strands to be cured after the fabric is formed during a post-heating process. The present invention in fabric form is useful as a preform which can be used in a resin transfer molding (RTM) process.

In order that the invention may be more readily understood, reference is made to the following examples, which are intended to be illustrative of the invention, but are not intended to limit the scope of the present invention.

EXAMPLE 1

An aqueous chemical treatment was prepared in accordance with the present invention which included 5000 g of EPI-REZ 3522-W-60 (about 60% solids, available from Shell Chemical Co.), 60 g of dicyandiamide, 15 g of 2-methyl imidazole, 60 g of a silane coupling agent (commercially available from OSI Specialties Group of Witco Chemical under the product name A-187), 214 g of butoxy ethyl stearate, and 1000 g of deionized water. The composition of the resulting chemical treatment, in weight percent, was as follows:

- 86.9% EPI-REZ 3522-W-60
- 0.6% dicyandiamide
- 0.2% 2-methyl imidazole
- 0.7% A187 silane
- 1.3% butoxy ethyl stearate
- 10.3% deionized water The chemical treatment was initially applied to a plurality of glass fibers with an applicator roller at a rate of 130 g/min. The coated fibers were then dried by a heating device as described in the above incorporated U.S. application Ser. No. 08/291,801, filed Aug. 17, 1994, now abandoned. The dried fibers had a polymer or organic compound content of about 22% by weight. The strand of coated fibers was subsequently filament wound and placed in opposing metal die molds which were heated at about 300–350° F. for approximately one half hour to effect full curing. No additional resin was applied to the fibers prior to the forming operation.

EXAMPLE 2

The chemical treatment prepared in Example 1 was applied to a plurality of fibers which were subsequently dried by a heating device. The resulting coated fibers had a content of organic chemical treatment constituents of about 25% by weight. The coated fibers were formed into a unidirectional ply which was consolidated and cured for 4 hours at a temperature of about 350° F. No additional resin was applied to the coated fibers prior to laminate formation.

EXAMPLE 3

A non-aqueous chemical treatment was prepared in accordance with the present invention which included 4500 g of EPON 862 bisphenol F epoxy available from Shell Chemical Co., 1500 g of butyl glycidyl ether reactive diluent, 90 g of EMI-24 2-ethyl-4-methyl imidazole, 100 g of an epoxy silane coupling agent (A-187 available from OSI Specialties Group of Witco Chemical), and from about 100 g to about 300 g of water which acted as a polar agent and viscosity modifier. The chemical treatment was applied to a plurality of glass fibers with an applicator roller at a rate of 120 g/min. The coated fibers were then heated with a heating device to achieve a content of organic chemical treatment constituents of about 25% by weight. Curing of the coated thermoset resin was effected when the strand of coated fibers was subsequently filament wound or tape wound around a mandrel and heated at about 250–300° F. for approximately one half hour.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A method of forming coated fibers suitable for making a composite article comprising the steps of:
    a) drawing a plurality of fibers from a source of molten glass
    b) applying, in-line with step a), a nonaqueous or aqueous chemical treatment comprising a curable thermosetting resin to said fibers
    c) heating on a contact plate, in-line with step b), the resultant fibers so that the following is preformed during said heating step: driving off water, if present; and partially curing said resin
    d) thereby forming coated fibers such that said coated fibers are loaded with about 30% by weight or more of said chemical treatment.

2. The method of claim 1 in which said chemical treatment includes a curing agent for said resin.

3. The method of claim 2 in which said resin comprises an epoxy resin.

4. The method of claim 2 in which said curing agent comprises an amine.

5. The method of claim 1, further including the step of fully curing said resin on said fibers in a subsequent forming operation.

6. A method of forming coated fibers suitable for making a composite article comprising the steps of:
    a) drawing a plurality of fibers from a source of molten glass
    b) applying, in-line with step a), an aqueous based chemical treatment comprising a curable thermosetting resin to said fibers
    c) heating on a contact plate, in-line with step b), the resultant fibers so that the following is preformed during said heating step: driving off water; and partially curing said resin
    d) thereby forming coated fibers such that said coated fibers are loaded with about 25% by weight or more of said chemical treatment.

* * * * *